United States Patent

Baker, Jr.

[15] 3,702,024
[45] Nov. 7, 1972

[54] METHOD OF LINING METALLIC WALLED CARRIERS

[72] Inventor: Charles P. Baker, Jr., Hinsdale, Ill.
[73] Assignee: Omark Industries, Incorporated, Portland, Oreg.
[22] Filed: Nov. 10, 1969
[21] Appl. No.: 875,599

Related U.S. Application Data

[62] Division of Ser. No. 723,502, April 23, 1968, abandoned.

[52] U.S. Cl. .......................29/407, 29/455, 29/525, 29/526, 52/404, 219/99, 220/63
[51] Int. Cl. ...............................................B23q 17/00
[58] Field of Search........29/455, 155, 526, 407, 525; 52/404, 334; 219/98, 99; 220/63

[56] References Cited

UNITED STATES PATENTS

| 1,238,206 | 8/1917 | Shuler | 29/526 UX |
| 2,833,631 | 5/1958 | Rossheim et al. | 220/63 X |
| 2,993,110 | 7/1961 | Godley | 52/404 X |
| 3,343,227 | 9/1967 | Brown et al. | 52/404 X |
| 3,442,417 | 5/1969 | Pollanz | 29/455 X |

OTHER PUBLICATIONS

Nelson Stud Welding In Construction Oct. 19, 1959 (pages 1–4 relied on)

Primary Examiner—Charlie T. Moon
Attorney—Charles F. Duffield

[57] ABSTRACT

Method and apparatus for securing liners to metallic walled cargo carriers including an end weldable stud adapted to pass through an aperture in the liner and to be end welded to the metallic wall of the cargo carrier by means of an electric stud end welding technique together with a spring retainer including a thin flange on one end larger than the aperature in the wall panel and spring fingers projecting inwardly and away from the flange and into the aperature of the panel to permit the retainer to fit flush with the outer surface of the wall panel and to grip the stud to secure the wall panel in engagement with the metallic wall of the cargo carrier.

1 Claim, 2 Drawing Figures

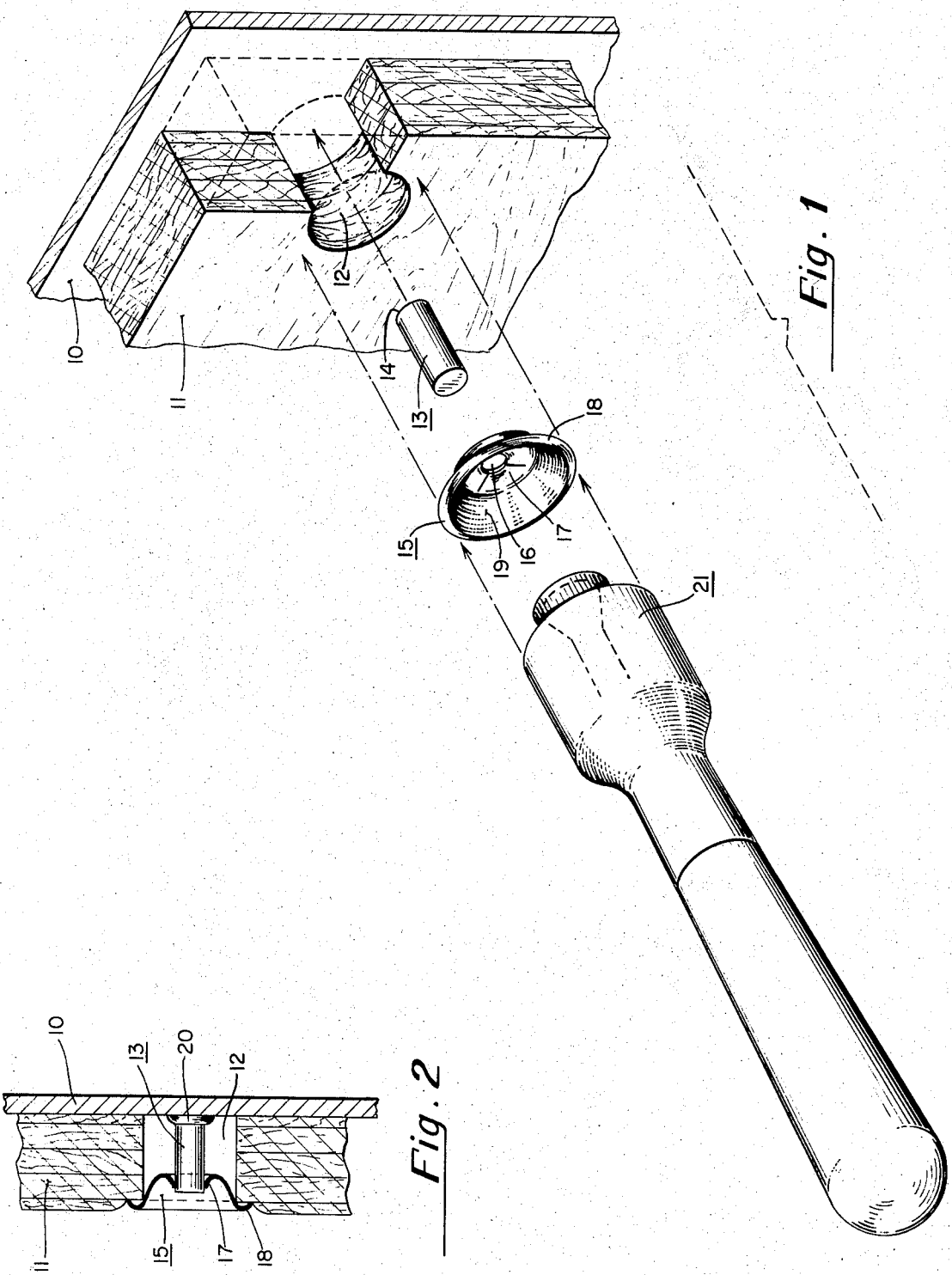

3,702,024

METHOD OF LINING METALLIC WALLED CARRIERS

SUMMARY OF INVENTION

This invention relates to methods and apparatus for securing liner panels to the inside of metallic walled cargo carriers and is a division of application Ser. No. 723,502 filed Apr. 23, 1968, now abandoned.

Most cargo containers are made of metallic walls which are necessary for the proper strength, durability and security of the cargo. Nevertheless, for the protection of the cargo, such containers have a more resilient and smoother lining on the inside of the container such as plywood, fiberglass or other such material. Such construction as this is quite frequently found on the inside of railway box cars, highway trailers truck bodies, and even in large containers such as ship bulkheads.

Panels of this type are secured to the metallic walls of such cargo containers by a number of different methods. For example, in one method, wooden stringers or furrings are placed at spaced positions along the wall to be so panelled and secured thereto by means of bolts. Then the panels are placed against the wood furrings and appropriately nailed or otherwise secured by means such as lag screws or bolts. Such a system is costly in that threaded fasteners must be used and, as well, time consuming and thus costly in assembly.

The new method and apparatus of the present invention eliminates such costly plurality of parts and materials necessary to secure the panel in place and also eliminates the excessive time involved in assembling such a panel to a metallic wall.

By means of the present invention, the panel to be secured to the metallic wall of the cargo container need only be appropriately drilled at selected locations at which the panel is to be secured. An end weldable stud is inserted through the hole when the panel is in place and end welded to the metallic wall of the cargo container by means of an electric stud end welding technique. After the stud is so welded, a spring retainer including a flange of diameter larger than the hole in the panel and spring fingers projecting inwardly of the flange, is inserted over the stud and into the hole and driven downwardly over the stud to pull the panel into secure tensioned engagement with the metallic wall of the cargo container.

The spring retainer is so designed that, when in place, it is flush with the wall of the cargo container and thus does not present any obstruction to the cargo.

Other objects and advantages of the present invention will be apparent from the following description thereof taken in conjunction with the drawings.

DESCRIPTION OF DRAWINGS

FIG. 1 is an exploded isometric view of the fastener of the present invention shown in respect to the wall and panel that it is to secure together; and FIG. 2 is a cross-sectional view of the fastener of the present invention when in place.

DESCRIPTION OF INVENTION

Referring to FIG. 1, there is shown a portion of a wall 10 of a metallic walled cargo container to which it is desired to secure a softer and resilient panel 11, here shown as plywood.

The panel 11 is appropriately drilled with apertures 12 at the various locations at which it is desired to secure the panel to the metallic wall 10.

A stud 13 is next disposed and centered within the aperture 12 and one end 14 thereof end welded to the wall 10 by means of an electric stud end welding technique.

Such a stud end welding technique may be one of different types including the drawn arc and capacitor discharge techniques which have come to be well known. An example of the equipment and methods of such electric stud welding techniques may be seen in Pease U.S. Pat. No. 3,313,912, Apr. 11, 1967, or Pease U.S. Pat. No. 3,315,062, Apr. 18, 1967.

Generally, in such a technique, high current is passed through the stud causing the contiguous portions between the end of the stud and the metal wall to which it is welded, to become molten resulting in a stud weld joint or fillet 20 as shown in FIG. 2.

The stud 13 in the embodiment disclosed in FIGS. 1 and 2 is of a smooth cylindrical configuration of constant diameter throughout its length. The total length of the stud is selected such that, after the end of the stud has been welded as shown in FIG. 2, the opposite end of the stud will not project beyond the surface of the panel 11. This is desirable in order to eliminate any interference or sharp edges projecting from the surface of the panel when in place.

Once the stud has been welded to the wall 10 of the container as shown in FIG. 2, a spring retainer 15 is then positioned over the aperature 12 and in engagement with the stud.

This spring retainer includes a thin upper flange 15 which is of a larger diameter than the hole or aperature 12 and which is designed to engage the outer surface of the panel when in place.

The spring retainer is also cup shaped and includes side walls 19 therein and a plurality of spring fingers 17. The spring fingers 17 are so disposed as to extend inwardly toward the center of the retainer and terminate by defining a hold 16 of diameter less than that of the stud 13.

The retainer 15, once in place over the stud and the aperature 12 in the panel, is impacted onto the stud toward the wall of the cargo container, and in this manner draws the panel 11 into tensioned engagement with the metallic wall of the cargo container. In this position, the flange of the retainer will be flush with or below the surface of the panel.

The fingers 17 of the spring retainer are further inclined upwardly toward the center of the retainer, as may be seen in FIG. 2, to permit the retainer to pass easily over the stud in the direction of the metallic wall, but to provide a locking fit against movement in the opposite direction, once in place.

A suitable tool 21 having an end configuration complimentary with that of the retainer and stud may be used, as shown in FIG. 1, to drive the retainer in place. If desired, a suitable impact hammer may also be used to drive the retainer in place.

When it is necessary to replace the panels, the spring retainers can be removed by a similar tool (not shown) to that used to place the retainers on the studs. This has special advantages in that the studs which were earlier used may be reused to secure the new panels and all that need be added for the second relining of the cargo container is a new spring retainer.

Although the invention has been described in its preferred form with a certain degree of particularity, it is understood that the present disclosure is of a preferred form and has been made only by way of example and that numerous changes in the details of construction and the combination and arrangement of parts may be restored to without departing from the spirit and scope of the invention hereinafter claimed.

I claim:

1. The method of lining metallic walled cargo carriers with liner panels comprising the steps of:

perforating the panel with holes of diameter in excess of the diameter of the chuck of a stud welding gun at predetermined locations at which it is desired to secure the panel to the metallic wall of the cargo carrier, positioning the panel in place, positioning a smooth elongated metallic stud of length less than the thickness of the panel into the chuck of the stud welding gun and inserting the chuck of the stud welding gun through the perforation to bring the end of the stud into contact with the metallic wall and center the stud within the hole, welding one end of the stud to the metallic wall by means of the electric stud end welding technique, positioning a speed nut having an outer flange of diameter larger than the hole and an extended resilient stud engaging portion in engagement with the outer surface of the panel and stud respectively; and impacting the speed nut with sufficient force to draw the panel into tensioned engagement with the metallic wall.

* * * * *